US011645790B2

(12) United States Patent
Echevarria Vallespi et al.

(10) Patent No.: US 11,645,790 B2
(45) Date of Patent: May 9, 2023

(54) SYSTEMS FOR GENERATING ACCESSIBLE COLOR THEMES (71) Applicant: Adobe Inc., San Jose, CA (US)

(72) Inventors: Jose Ignacio Echevarria Vallespi, Belmont, CA (US); Syed Mohd Mehadi, Noida (IN); Shubham Seth, New Delhi (IN); Anurag Singhal, Najafgarh (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/490,270

(22) Filed: Sep. 30, 2021

(65) Prior Publication Data
US 2023/0098695 A1    Mar. 30, 2023

(51) Int. Cl.
| G06T 11/00 | (2006.01) |
| G06T 7/90 | (2017.01) |
| G09G 5/02 | (2006.01) |
| G09G 5/06 | (2006.01) |
| G06K 9/46 | (2006.01) |
| G06K 9/32 | (2006.01) |
| G09B 21/00 | (2006.01) |

(52) U.S. Cl.
CPC ................... *G06T 11/001* (2013.01)

(58) Field of Classification Search
CPC ............... G06K 9/4652; G06K 9/4642; G06K 9/3233; G09B 21/008; G09G 5/02; G09G 5/06; G09G 2340/06; G09G 2380/08; G06T 7/90; G06T 11/001
See application file for complete search history.

(56) References Cited

U.S. PATENT DOCUMENTS

| 9,984,658 | B2* | 5/2018 | Bonnier | G09G 5/04 |
| 10,319,116 | B1 | 6/2019 | C et al. | |
| 2004/0085327 | A1* | 5/2004 | Jones | G09B 29/003 |
| | | | | 345/591 |
| 2005/0111019 | A1 | 5/2005 | Nakauchi | |
| 2005/0270302 | A1* | 12/2005 | Weast | G06T 11/001 |
| | | | | 345/590 |
| 2007/0182755 | A1* | 8/2007 | Jones | G06T 11/001 |
| | | | | 345/592 |

(Continued)

OTHER PUBLICATIONS

U.S. Appl. No. 16/682,999, "Notice of Allowance", U.S. Appl. No. 16/682,999, dated May 27, 2022, 9 pages.

(Continued)

*Primary Examiner* — Wesner Sajous
(74) *Attorney, Agent, or Firm* — FIG. 1 Patents (57) ABSTRACT

In implementations of systems for generating accessible color themes, a computing device implements an accessibility system to receive an input color palette including original colors defined in a color space. The accessibility system generates color vision deficiency simulations that correspond to pairs of the original colors and computes perceptual color differences between the color vision deficiency simulations. Candidate colors are determined for corresponding original colors based at least partially on the perceptual color differences and a conflicting perceptual color difference. The accessibility system outputs an output color palette including replacement colors defined in the color space that are generated at least partially based on distances between the candidate colors and the corresponding original colors computed in a CIELAB color space.

20 Claims, 8 Drawing Sheets
(5 of 8 Drawing Sheet(s) Filed in Color)

(56) References Cited

U.S. PATENT DOCUMENTS

| | | | | |
|---|---|---|---|---|
| 2012/0147163 | A1* | 6/2012 | Kaminsky | G09G 5/028 |
| | | | | 345/590 |
| 2014/0153825 | A1* | 6/2014 | Jones | G06T 5/00 |
| | | | | 382/167 |
| 2017/0290504 | A1 | 10/2017 | Khaderi et al. | |
| 2019/0258087 | A1* | 8/2019 | Valentine | G02C 7/107 |
| 2021/0142531 | A1* | 5/2021 | Echevarria Vallespi | |
| | | | | G09B 5/06 |
| 2021/0142532 | A1* | 5/2021 | Echevarria Vallespi | |
| | | | | G06T 11/001 |
| 2021/0157171 | A1* | 5/2021 | Valentine | G02B 5/285 |
| 2021/0358182 | A1* | 11/2021 | Ward | G09B 21/008 |
| 2022/0075211 | A1* | 3/2022 | Schmeder | G02C 7/022 |

OTHER PUBLICATIONS

"Final Office Action", U.S. Appl. No. 16/682,999, dated Jan. 27, 2022, 18 pages.

"Adobe Color Accessibility Tools", Adobe Inc., Adobe Color [online][retrieved Aug. 12, 2021], Retrieved from the Internet <https://color.adobe.com/create/color-accessibility>., Jun. 15, 2020, 2 Pages.

"First Action Interview Office Action", U.S. Appl. No. 16/682,999, dated Feb. 8, 2021, 4 pages.

"Pre-Interview First Office Action", U.S. Appl. No. 16/682,999, dated Nov. 9, 2020, 4 pages.

Machado, Gustavo M. et al., "A Physiologically-based Model for Simulation of Color Vision Deficiency—Online Summary", Institute de Informática, UFRGS [online][retrieved Sep. 20, 2021], Retrieved from the Internet <https://www.inf.ufrgs.br/~oliveira/pubs_files/CVD_Simulation/CVD_Simulation.html>., 2009, 4 pages.

Machado, Gustavo M. et al., "A Physiologically-based Model for Simulation of Color Vision Deficiency", IEEE Transactions on Visualization and Computer Graphics, vol. 15, No. 6 [retrieved Aug. 12, 2021], Retrieved from the Internet <http://citeseerx.ist.psu.edu/viewdoc/download;jsessionid=981E285427E406D125614C4C4831F163?doi=1 0.1.1.307.2661&rep=rep1&type=pdf>., Oct. 23, 2009, 8 Pages.

* cited by examiner

SYSTEMS FOR GENERATING ACCESSIBLE COLOR THEMES

BACKGROUND

Selection of color combinations is one of the most important tools available to a digital artist as part of creating and/or editing digital content. For instance, use of different groups of colors in digital artwork not only changes a visual appearance of the digital artwork but often completely changes a message or a theme conveyed by the digital artwork as well. Accordingly, color accessibility or selection of color combinations that are distinguishable when perceived by users with color vision deficiency is a significant factor in color theme design. Color vision deficiency refers to several different conditions that cause users with one of these conditions to perceive certain colors differently than users without color vision deficiency. Because of this perceptual difference and depending on the specific conditions of the users with color vision deficiency, these users have difficulty distinguishing between red colors and green colors, blue colors and green colors, yellow colors and orange colors, etc.

In order to ensure that a particular combination of colors is color accessible, a variety of techniques have been developed which are capable of identifying color conflicts between pairs of colors. A color conflict between a pair of colors indicates that at least some users with color vision deficiency are unable to distinguish between the pair of colors. Although systems that identify color conflicts are helpful, these systems are inefficient for determining combinations of colors or color palettes that do not include colors which conflict. For example, if a color palette includes a color conflict, then a user iteratively changes the colors and rechecks the changed colors until no color conflicts are identified.

Conventional systems for generating groups of colors that are color accessible leverage confusion lines in order to prevent color conflicts. A confusion line refers to a line in a color space that represents color confusion/conflict for a specific type of color vision deficiency such as protanopia, deuteranopia, or tritanopia. Given an input color palette that includes conflicting colors, conventional systems select new colors for the color palette that are not on a confusion line in the color space.

However, conventional systems frequently select new colors for a group of colors inaccurately, e.g., in a manner that creates a color conflict between colors included in the group of colors. For example, the new colors selected by conventional systems for an input color palette of five colors include a color conflict (are not accurate) more than 40 percent of the time. In another example, the new colors selected by conventional systems for an input color palette of 10 colors include a color conflict (are not accurate) more than 90 percent of the time. As a result of these inaccuracies, conventional systems are not usable in practical applications such as coloring digital content or selecting colors of physical paint.

SUMMARY

Techniques and systems are described for generating accessible color themes. In an example, a computing device implements an accessibility system to receive an input color palette including original colors defined in a color space. For example, the color space is an sRGB color space. The original colors include conflicting colors which are not distinguishable under conditions of color vision deficiency.

The accessibility system generates color vision deficiency simulations that correspond to pairs of the original colors and computes perceptual color differences between the color vision deficiency simulations. Candidate colors are determined for corresponding original colors based at least partially on the perceptual color differences and a conflicting perceptual color difference. The accessibility system outputs an output color palette including replacement colors defined in the color space that are generated at least partially based on distances between the candidate colors and the corresponding original colors computed in a CIELAB color space.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

FIGS. 3A, 3B, and 3C illustrate an example of generating replacement colors by optimizing an objective function.

DETAILED DESCRIPTION

Overview

Conventional systems for generating groups of colors which are color accessible leverage confusion lines defined in a color space that is not perceptually uniform. Colors that are on a confusion line in the color space are not distinguishable by users with a color vision deficiency. For instance, given a group of input colors, conventional systems select new colors for the input colors that are not on a confusion line in the color space.

However, these new colors are not usable in practical applications because of the accuracy limitations of conventional systems. For an input group of six colors that includes colors that conflict, conventional systems select new colors for the group such that the new colors also include colors that conflict more than 50 percent of the time. This technical problem gets worse as the number of input colors is increased. For example, given an input group of seven colors, conventional systems inaccurately select new colors for the group that include conflicting colors more than two thirds of the time.

In order to overcome the accuracy limitations of conventional systems, techniques and systems are described for generating accessible color themes by leveraging color vision deficiency simulations in a color space that is perceptually uniform. In one example, a computing device implements an accessibility system to receive an input color palette including original colors defined in a color space. For example, the color space is sRGB, HSV, HSL, CMYK, CIELUV, CIELAB, LCh, and so forth. The original colors include conflicting colors that are indistinguishable when perceived by a user with a color vision deficiency such as protanopia, deuteranopia, tritanopia, etc.

The accessibility system generates color vision deficiency simulations that correspond to pairs of the original colors. For example, the color vision deficiency simulations are based on electrophysiological data and include color vision deficiency simulations for protanopia, deuteranopia, and tritanopia at a maximum severity. The accessibility system computes CIEDE2000 perceptual color differences between the color vision deficiency simulations that correspond to the pairs of the original colors. For example, the accessibility system defines a conflicting perceptual color difference as CIEDE2000 perceptual color difference between color vision deficiency simulations for a pair of original colors that is less than a threshold perceptual color difference, e.g., 5 units.

The accessibility system determines candidate colors for corresponding original colors based at least partially on the CIEDE2000 perceptual color differences and the conflicting perceptual color difference. In one example, the accessibility system optimizes an objective function that includes a term for the perceptual color differences, a term that constrains the candidate colors to a gamut of the color space used to define the original colors, and a term for distances between the candidate colors and the corresponding original colors in a CIELAB color space. In some examples, the accessibility system optimizes the objective function using a non-derivative-based optimization algorithm such as a Nelder-Mead simplex direct search algorithm In other examples, the accessibility system optimizes the objective function using a derivative-based optimization algorithm.

The accessibility system outputs an output color palette including replacement colors defined in the color space used to define toe original colors that are generated by optimizing the objective function. The replacement colors are visually similar to the original colors due to the term for the distances between the candidate colors and the corresponding original colors. For instance, the replacement colors do not include any conflicting colors. This is impossible or impractical using conventional systems that leverage confusion lines due to the inaccuracies of these conventional systems.

The described systems are capable of generating output color palettes with significantly increased accuracy compared to the conventional systems which inaccurately select new colors for an input color palette of five colors more than 40 percent of the time. For an input color palette of five colors which include a color conflict, the described systems are capable of generating output color palettes with replacement colors that do not include a color conflict more than 95 percent of the time. Because of this improvement, the described systems are usable in practical applications such as coloring digital and/or physical artwork, color coding instructional materials, and so forth.

Term Examples

As used herein, the term "perceptually uniform color space" refers to a color space defined such that a perceptual color difference between a first pair of color values that are separated by a particular Euclidean distance within the color space is equal to a perceptual color difference between a second pair of color values that are separated by the particular Euclidean distance within the color space.

As used herein, the term "conflicting perceptual color difference" refers to a perceptual color difference between color vision deficiency simulations for a pair of colors that is less than a threshold perceptual color difference.

As used herein, the term "color vision deficiency simulation" for a color refers to a modification applied to the color that simulates perception of the color for a type of color vision deficiency. By way of example, types of color vision deficiencies include protanopia (missing or abnormal "red" cone cells), deuteranopia (missing or abnormal "green" cone cells), tritanopia (missing or abnormal "blue" cone cells), and so forth.

As used herein, the term "confusion line" refers to a line in a color space that represents color confusion for a specific type of color vision deficiency such as protanopia, deuteranopia, tritanopia, etc.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

Figure 1:
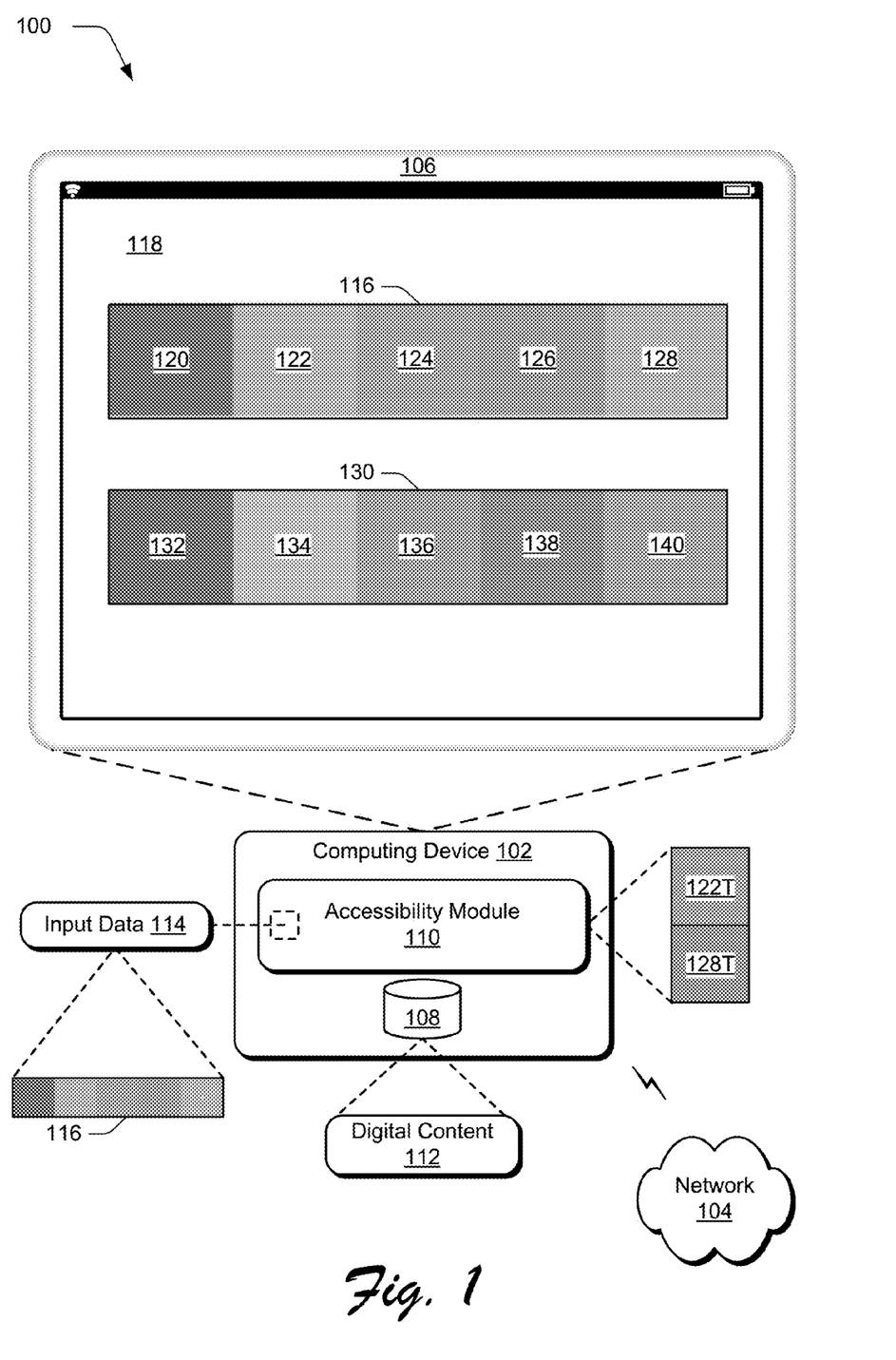
FIG. 1 is an illustration of an environment in an example implementation that is operable to employ digital systems and techniques for generating accessible color themes as described herein.

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and an accessibility module 110. The storage device 108 is illustrated to include digital content 112 such as digital images, digital artwork, digital videos, etc.

In the environment 100, the accessibility module 110 is illustrated as having, receiving, and/or transmitting input data 114. As shown, the input data 114 describes an input color palette 116 which is rendered in a user interface 118 of the display device 106. The input color palette 116 includes five original colors 120-128 which are usable to create and/or edit digital content 112. For instance, the original colors 120-128 are defined in a color space such as sRGB, HSV, HSL, CMYK, CIELUV, CIELAB, LCh, etc. In one example, the original colors 120-128 are defined in a perceptually uniform color space. In another example, the original colors 120-128 are defined in a color space that is not perceptually uniform.

For example, a digital artist uses the input color palette 116 to create a digital instruction manual for assembling a product from components. This digital instruction manual uses different ones of the original colors 120-128 to indicate how to combine the components to assemble the product. In this example, it is important that a user of the digital instruction manual is able to visually differentiate between the original colors 120-128, e.g., to correctly assemble the product.

In order to determine whether a user with color vision deficiency is capable of differentiating between the original colors 120-128, the accessibility module 110 processes the input data 114 to convert the original colors 120-128 into a CIELAB color space or to confirm that the original colors 120-128 are defined in the CIELAB color space. The accessibility module 110 then generates color vision deficiency simulations for each of the original colors 120-128. The color vision deficiency simulations visually approximate how a user with a particular color vision deficiency would perceive each of the original colors 120-128.

In one example, these color vision deficiency simulations include simulations for protanopia (missing or abnormal "red" cone cells), deuteranopia (missing or abnormal "green" cone cells), and tritanopia (missing or abnormal "blue" cone cells). In this example, the accessibility module 110 generates the simulations for protanopia, deuteranopia, and tritanopia at maximum severity. The accessibility module 110 then computes CIEDE2000 perceptual color differences between the color vision deficiency simulations to identify color conflicts between pairs of the original colors 120-128.

For instance, the accessibility module 110 defines a color conflict between a pair of colors included in the original colors 120-128 as a CIEDE2000 perceptual color difference between any of the color vision deficiency simulations generated for the pair of colors which is less than 5 units. Accordingly, if a CIEDE2000 perceptual color difference between protanopia simulations for the pair of colors is less than 5 units, then the accessibility module 110 identifies a color conflict between the pair of colors. If a CIEDE2000 perceptual color difference between deuteranopia simulations for the pair of colors is less than 5 units, then the accessibility module 110 also identifies a color conflict. Similarly, if a CIEDE2000 perceptual color difference between tritanopia simulations for the pair of colors is less than 5 units, then the accessibility module 110 identifies a color conflict between the pair of colors.

Based on the conflicting perceptual color difference, the accessibility module 110 identifies a conflict between original color 122 and original color 128 for tritanopia because a CIEDE2000 perceptual color difference between a tritanopia simulation 122T for the original color 122 and a tritanopia simulation 128T for the original color 128 is less than 5 units. As shown in FIG. 1, the tritanopia simulation 122T and the tritanopia simulation 128T are indistinguishable. For example, a person with tritanopia could not distinguish between the original color 122 and the original color 128.

Because of this conflict between the original colors 122, 128, the computing device 102 implements the accessibility module 110 to generate an output color palette 130 based on the conflicting perceptual color difference and the input color palette 116. To do so in one example, the accessibility module 110 optimizes an objective function that does not leverage or utilize confusion lines. Confusion lines are lines in a color space that represent color confusion for a specific type of color vision deficiency. The objective function does not include terms which utilize confusion lines.

The objective function includes terms for generating the output color palette 130 to include colors which do not conflict but are visually similar to the original colors 120-128. The terms of the objective function influence a manner in which the accessibility module 110 selects colors to include in the output color palette 130. For example, the objective function also includes a term for generating the output color palette 130 to include colors which are constrained to a gamut of a color space used to define the original colors 120-128 as described in greater detail with respect to FIG. 2.

For instance, the accessibility module 110 computes a CIEDE2000 perceptual color difference between the color vision deficiency simulations for each unique pair of the original colors 120-128. Consider an example in which the accessibility module 110 computes a CIEDE2000 perceptual color difference between a color vision deficiency simulation for protanopia for original color 120 and a color vision deficiency simulation for protanopia for the original color 122; a CIEDE2000 perceptual color difference between a color vision deficiency simulation for deuteranopia for the original color 120 and a color vision deficiency simulation for deuteranopia for the original color 122; and a CIEDE2000 perceptual color difference between a color vision deficiency simulation for tritanopia for the original color 120 and a color vision deficiency simulation for tritanopia for the original color 122. In this example, the accessibility module 110 computes a CIEDE2000 perceptual color difference between the color vision deficiency simulation for protanopia for the original color 120 and a color vision deficiency simulation for protanopia for each of the original colors 124-128; a CIEDE2000 perceptual color difference between the color vision deficiency simulation for deuteranopia for the original color 120 and a color vision deficiency simulation for deuteranopia for each of the original colors 124-128; and a CIEDE2000 perceptual color difference between the color vision deficiency simulation for tritanopia for the original color 120 and a color vision deficiency simulation for tritanopia for each of the original colors 124-128.

Continuing the pervious example, the accessibility module 110 computes a CIEDE2000 perceptual color difference between the color vision deficiency simulation for protanopia for the original color 122 and the color vision deficiency simulation for protanopia for each of the original colors 124-128; a CIEDE2000 perceptual color difference between the color vision deficiency simulation for deuteranopia for the original color 122 and the color vision deficiency simulation for deuteranopia for each of the original colors 124-128; and a CIEDE2000 perceptual color difference between the color vision deficiency simulation for tritanopia for the original color 122 and the color vision deficiency simulation for tritanopia for each of the original colors 124-128. Similarly, the accessibility module 110 computes a CIEDE2000 perceptual color difference between the color vision deficiency simulation for protanopia for the original color 124 and the color vision deficiency simulation for protanopia for each of the original colors 126, 128; a CIEDE2000 perceptual color difference between the color vision deficiency simulation for deuteranopia for the original color 124 and the color vision deficiency simulation for deuteranopia for each of the original colors 126, 128; and a CIEDE2000 perceptual color difference between the color vision deficiency simulation for tritanopia for the original color 124 and the color vision deficiency simulation for tritanopia for each of the original colors 126, 128. Finally, the accessibility module 110 computes a CIEDE2000 perceptual color difference between the color vision deficiency simulation for protanopia for the original color 126 and the color vision deficiency simulation for protanopia for the original color 128; a CIEDE2000 perceptual color difference between the color vision deficiency simulation for deuteranopia for the original color 126 and the color vision deficiency simulation for deuteranopia for the original color 128; and a CIEDE2000 perceptual color difference between the color vision deficiency simulation for tritanopia for the original color 126 and the color vision deficiency simulation for tritanopia for the original color 128.

Continuing this example, the accessibility module 110 determines candidate colors for corresponding original colors 120-128 based at least partially on the computed perceptual color differences between the color vision deficiency simulations for the original colors 120-128 and the conflicting perceptual color difference. The accessibility module 110 outputs the output color palette 130 including replacement colors 132-140 defined in the color space used to define the original colors 120-128 based at least partially on distances between the candidate colors and the corresponding original colors 120-128 computed in the CIELAB color space. For example, the accessibility module 110 generates the candidate colors for the corresponding original colors 120-128 to increase perceptual color differences between the color vision deficiency simulations for the original colors 120-128 and the accessibility module 110 selects the replacement colors 132-140 from the candidate colors such that the replacement colors 132-140 correspond to ones of the candidate colors that are a minimum distance from the corresponding original colors 120-128 in the CIELAB color space.

By optimizing the objective function in this manner, the original colors 122, 128 which are not distinguishable by the person with tritanopia are replaced with replacement colors 134, 140, respectively. As shown, the replacement colors 134, 140 are distinguishable by the person with tritanopia. Further, the replacement color 134 is visually similar to the original color 122 and the replacement color 140 is visually similar to the original color 128.

In this example, each of the original colors 120-128 is replaced by one of the replacement colors 132-140 in the output color palette 130. For instance, replacement color 132 is visually similar to the original color 120, replacement color 136 is visually similar to the original color 124, and replacement color 138 is visually similar to the original color 126. In other examples, the input data 114 also describes one or more of the original colors 120-128 to retain in the output color palette 130. In these other examples, a user interacts with an input device (a mouse, a stylus, a touchscreen, a keyboard, etc.) relative to the user interface 118 to indicate one of the original colors 120-128 to retain in the output color palette 130. For example, the input data 114 describes the input color palette 116 and an indication to retain the original color 120 in the output color palette 130. In this example, the output color palette 130 includes the original color 120 instead of the replacement color 132 that is visually similar to the original color 120.

Figure 2:
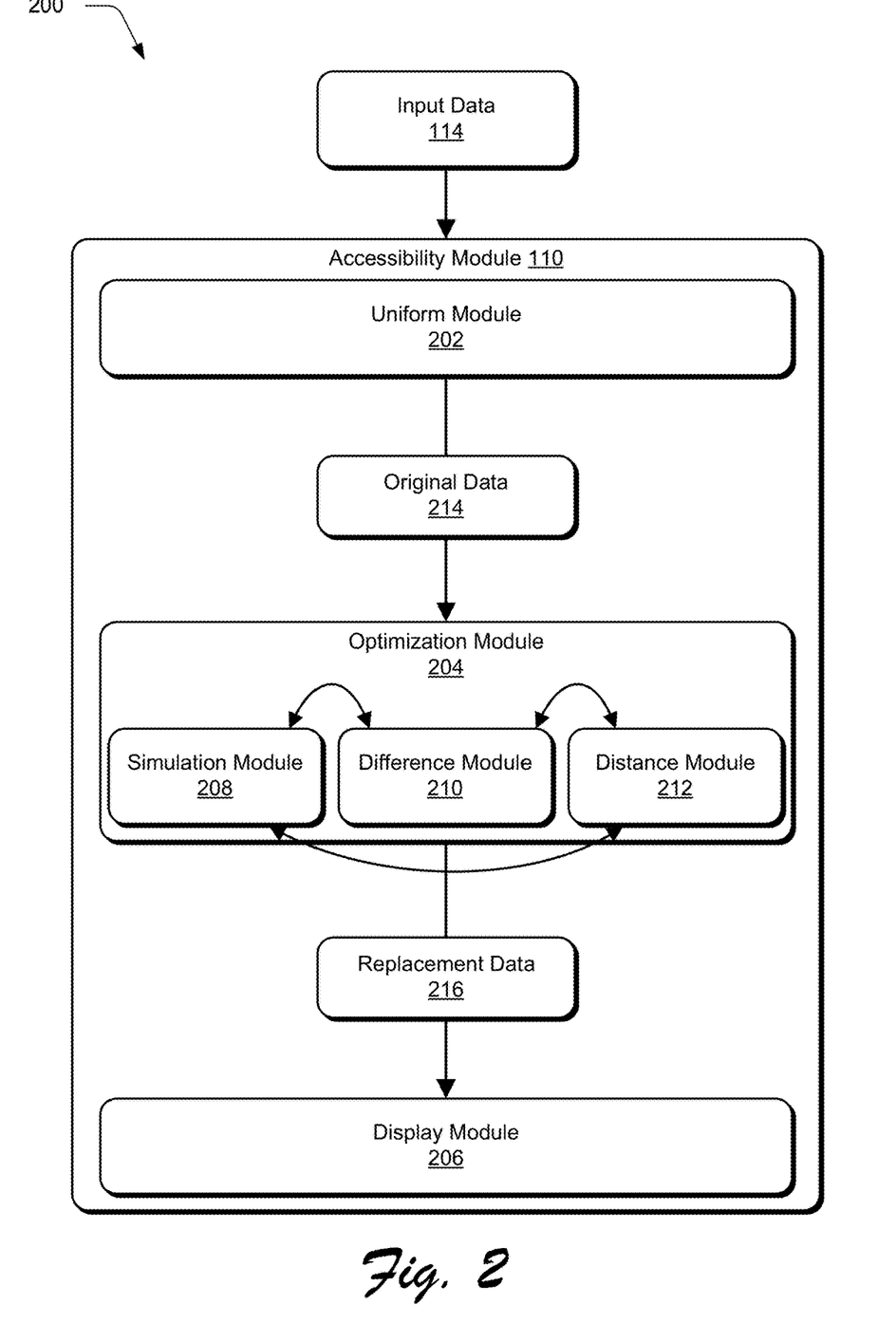
FIG. 2 depicts a system in an example implementation showing operation of an accessibility module for generating accessible color themes.

FIG. 2 depicts a system 200 in an example implementation showing operation of an accessibility module 110. The accessibility module 110 is illustrated to include a uniform module 202, an optimization module 204, and a display module 206. As shown, the optimization module 204 includes a simulation module 208, a difference module 210, and a distance module 212. The uniform module 202 receives the input data 114 and processes the input data 114 to generate original data 214. For instance, the input data 114 describes an input color palette and original colors of the input color palette to retain in an output color palette.

In one example, the input data 114 describes an input color palette including original colors defined in a color space that is not perceptually uniform such as sRGB, HSV CMYK, etc. In this example, the uniform module 202 processes the input data 114 to convert the original colors defined in the color space that is not perceptually uniform into original colors defined in a perceptually uniform color space such as a CIELAB color space. The uniform module 202 generates the original data 214 as describing the input color palette including the original colors defined in the perceptually uniform color space.

Figure 3A:
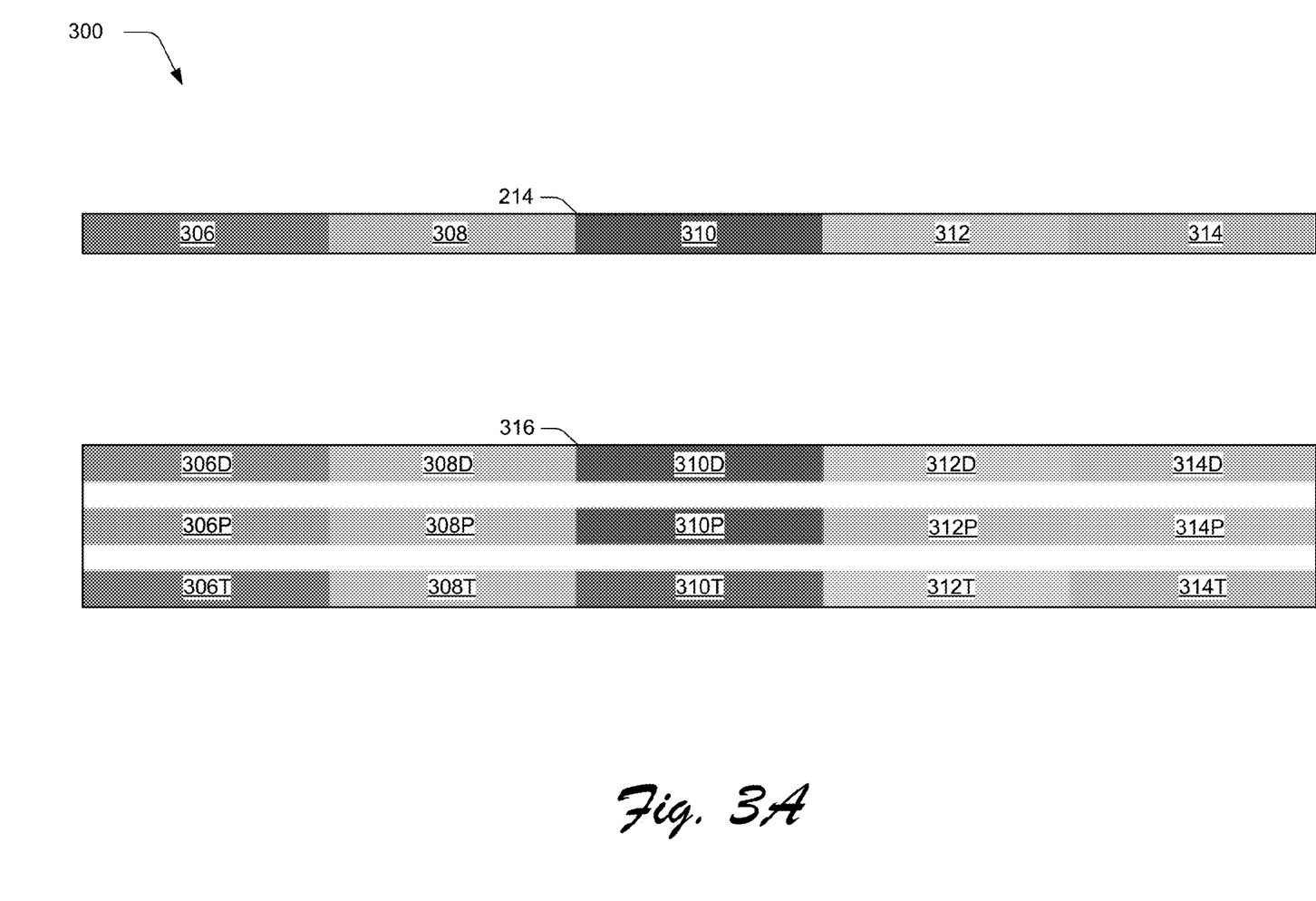
Figure 3C:
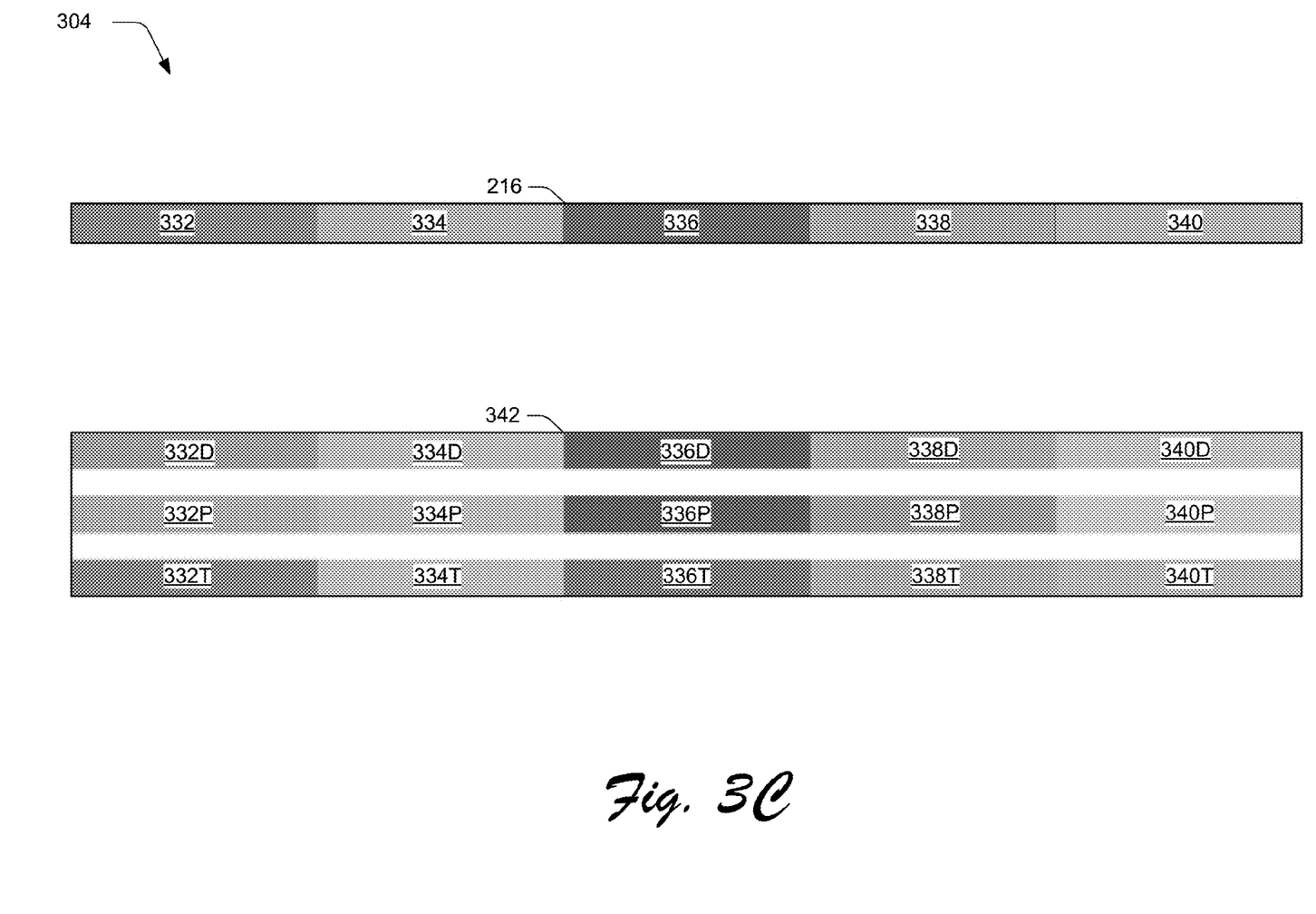

FIGS. 3A, 3B, and 3C illustrate an example of generating replacement colors by optimizing an objective function. FIG. 3A illustrates a representation 300 of color vision deficiency simulations generated for original colors of an input color palette. FIG. 3B illustrates a representation 302 of optimized colors in an optimization step of optimizing an objective function. FIG. 3C illustrates a representation 304 of an output color palette including replacement colors for the original colors of the input color palette.

With respect to FIG. 2 and FIG. 3A, the uniform module 202 generates the original data 214 as describing the original colors of the input color palette defined in the perceptually uniform color space. As shown in the representation 300, the original data 214 describes original colors 306-314. The optimization module 204 receives the original data 214 and processes the original data 214 to generate replacement data 216 by optimizing the objective function. To do so, the optimization module 204 implements the simulation module 208, the difference module 210, and the distance module 212 to determine replacement colors for the original colors 306-314 which are visually similar to the original colors 306-314, are visually distinguishable based on color vision deficiency simulations, and are constrained within a gamut of a color space used to define colors described by the input data 114.

For example, the optimization module 204 implements the simulation module 208 to generate color vision deficiency simulations 316 for the original colors 306-314. For an input color palette with n colors, $P=\{p_1, p_2, \ldots, p_n\}$, and $n \geq 2$, the simulation module 208 receives the original colors 306-314 $p_i$ defined in the perceptually uniform color space. In one example, the simulation module 208 receives the original colors 306-314 $p_i$ defined in the CIELAB color space.

The simulation module 208 defines the color vision deficiency simulations 316 as $L_i = \{pro_i, deu_i, tri_i\}$ where $pro_i$ is a color vision deficiency simulation for protanopia for $p_i$, $deu_i$ is a color vision deficiency simulation for deuteranopia for $p_i$, and $tri_i$ is a color vision deficiency simulation for tritanopia for $p_i$. For example, the simulation module 208 generates the color vision deficiency simulations 316 by multiplying the original colors 306-314 by simulation matrices described by Gustavo M. Machado et al., *A Physiologically-Based Model for Simulation of Color Vision Deficiency*, IEEE Transactions on Visualization and Computer Graphics, Vol. 15, No. 6, pp. 1291-1298 (2009), at maximum severity (e.g., severity 1.0). As shown in FIG. 3A, the color vision deficiency simulations 316 include color vision deficiency simulations for deuteranopia 306D, protanopia 306P, and tritanopia 306T for original color 306; color vision deficiency simulations for deuteranopia 308D, protanopia 308P, and tritanopia 308T for original color 308; color vision deficiency simulations for deuteranopia 310D, protanopia 310P, and tritanopia 310T for original color 310; color vision deficiency simulations for deuteranopia 312D, protanopia 312P, and tritanopia 312T for original color 312; and color vision deficiency simulations for deuteranopia 314D, protanopia 314P, and tritanopia 314T for original color 314.

The difference module 210 computes a CIEDE2000 perceptual color difference between each unique pair of the color vision deficiency simulations 316. In one example, the simulation module 208 receives the original colors 306-314 $p_i$ defined in the CIELAB color space and converts the original colors 306-314 $p_i$ into an RGB color space. In this example, the simulation module 208 generates the color vision deficiency simulations 316 in the RGB color space and then converts the color vision deficiency simulations 316 into the CIELAB color space to compute the perceptual color differences.

Consider an example in which the difference module 210 computes a CIEDE2000 perceptual color difference between the color vision deficiency simulation for deuteranopia 306D and the color vision deficiency simulation for deuteranopia 308D. In this example, the difference module 210 determines that the computed perceptual color difference is greater than 5 units. The difference module 210 also computes a CIEDE2000 perceptual color difference between the color vision deficiency simulation for protanopia 306P and the color vision deficiency simulation for protanopia 308P and determines that the perceptual color difference is greater than 5 units. Finally, the difference module 210 computes a CIEDE20000 perceptual color difference between the color vision deficiency simulation for tritanopia 306T and the color vision deficiency simulation for tritanopia 308T and determines that the perceptual color difference is greater than 5 units. Accordingly, the optimization module 204 determines that there is no conflict between the original color 306 and the original color 308 based on the conflicting perceptual color difference which is less than 5 units. In this example, a person with deuteranopia, protanopia, and/or tritanopia is capable of visually differentiating between the original color 306 and the original color 308.

For example, the difference module 210 computes a CIEDE2000 perceptual color difference between the color vision deficiency simulation for deuteranopia 308D and the color vision deficiency simulation for deuteranopia 312D and determines that the computed difference is less than 5 units. Based on this perceptual color difference, the optimization module 204 identifies a first conflict between the original color 308 and the original color 312, e.g., because the computed perceptual color difference is also the conflicting perceptual color difference. Continuing this example, the difference module 210 computes a CIEDE2000 perceptual color difference between the color vision deficiency simulation for protanopia 308P and the color vision deficiency simulation for protanopia 312P and determines that this computed difference is also less than 5 units. Accordingly, the optimization module 204 identifies a second conflict between the original color 308 and the original color 312. In this example, a person with deuteranopia is not capable of visually differentiating between the original color 308 and the original color 312 and a person with protanopia is also not capable of visually differentiating between the original color 308 and the original color 312.

The optimization module 204 implements the simulation module 208, the difference module 210, and/or the distance module 212 to define terms of the objective function. In one example, this is representable with respect to a candidate color $p_i^*$ at an optimization step as:

$$f_1 = \sum_{j \in n} \sum_{i<j} \sum_{s \in \{pro, deu, tri\}} \exp(-k\Delta E(s_i^*, s_j^*))$$

where: $f_1$ is a term to account for differences between the color vision deficiency simulations 316; $\Delta E$ is the CIEDE2000 perceptual color difference; k is a scaling factor for controlling optimization towards a target $\Delta E$ (e.g., k=10 controls optimization towards a target $\Delta E$ of 5 units); i and j define unique pairs of the original colors 306-314; $s_i^*$ is a color vision deficiency simulation for original color i; and $s_j^*$ is a color vision deficiency simulation for original color j.

For example, the optimization module 204 implements the simulation module 208, the difference module 210, and/or the distance module 212 to further define the objective function which is representable in an example in which the colors described by the input data 114 are defined in an sRGB color space as:

$$f_2 = \sum_{i \in n} \sum_{c \in \{R,G,B\}} |\min(p_{i,c}^*, 0)| + |\max(p_{i,c}^*, 1) - 1|$$

where: $f_2$ is a term to constrain candidate colors to the sRGB gamut (or any other desired gamut, for example, if the input data 114 describes colors defined in a different color space) and $p_{i,c}^*$ is a value in channel c of an sRGB color.

Continuing the previous example, the optimization module 204 implements the simulation module 208, the difference module 210, and/or the distance module to further define the objective function which is representable in one example as:

$$f_3 = \sum_{i \in n} \|p_i^* - p_i\|$$

where: $f_3$ is a term to ensure optimized colors are visually similar to the original colors 306-314 and $p_i^*$, $p_i$ are in a CIELAB color space.

Finally, the optimization module 204 combines $f_1$, $f_2$, and $f_3$ into the objective function which is representable as:

$$f=(w_1f_1+w_2f_2)\times(1-\text{tradeoff})+w_3f_3\times(\text{tradeoff})$$

where: tradeoff is a factor that controls whether replacement colors for the original colors 306-314 are generated with greater emphasis on visual closeness to the original colors 306-314 or with greater emphasis on color vision deficiency safety and $w_1$, $w_2$, and $w_3$ are weights.

In one example, the optimization module 204 sets tradeoff=0.2; $w_1$=1; $w_2$=100; and $w_3$=1. However, it is to be appreciated that in other examples tradeoff is greater than 0.2 or less than 0.2. In some examples, $w_1$ is greater than 1 or less than 1; $w_2$ is greater than 100 or less than 100; and $w_3$ is greater than 1 or less than 1. In the previous example, weight $w_2$ is significantly greater than weights $w_1$ and $w_3$ to constrain optimized colors in the gamut of the color space that defines the colors described by the input data 114.

For example, the optimization module 204 uses a Nelder-Mead simplex direct search numerical method to optimize the objective function. In this example, the optimization module 204 sets a maximum number of optimization steps to be 200 times a number of variables which is 600 times a number of colors included in the original colors 306-314 in an example in which each of the original colors 306-314 includes three channels. In other examples, the optimization module 204 uses a derivative-based optimization algorithm to optimize the objective function. In general, it is to be appreciated that the optimization module 204 is capable of optimizing the objective function using a variety of different derivative-based optimization algorithms and non-derivative-based optimization algorithms.

With respect to FIG. 3B, the representation 302 includes optimized colors 318 at an example optimization step of optimizing the objective function. As shown, the optimized colors 318 include candidate colors 320-328. For instance, candidate color 320 is visually similar to the original color 306; candidate color 322 is visually similar to the original color 308; candidate color 324 is visually similar to the original color 310; candidate color 326 is visually similar to original color 312; and candidate color 328 is visually similar to the original color 314. As further shown, the candidate colors 320-328 are each within the gamut of the color space used to define the colors described by the input data 114.

As part of optimizing the objective function, the optimization module 204 implements the simulation module 208 to generate color vision deficiency simulations 330 for the candidate colors 320-328. As illustrated, the color vision deficiency simulations 330 include color vision deficiency simulations for deuteranopia 320D, protanopia 320P, and tritanopia 320T for the candidate color 320; color vision deficiency simulations for deuteranopia 322D, protanopia 322P, and tritanopia 322T for the candidate color 322; color vision deficiency simulations for deuteranopia 324D, protanopia 324P, and tritanopia 324T for the candidate color 324; color vision deficiency simulations for deuteranopia 326D, protanopia 326P, and tritanopia 326T for the candidate color 326; and color vision deficiency simulations for deuteranopia 328D, protanopia 328P, and tritanopia 328T for the candidate color 328.

For instance, the optimization module 204 implements the difference module 210 to compute a CIEDE2000 perceptual color difference between each unique pair of the color vision deficiency simulations 330. In one example, the difference module 210 determines that a CIEDE2000 perceptual color difference between the color deficiency simulation for deuteranopia 322D and the color deficiency simulation for deuteranopia 326D is less than 5 units. Accordingly, the optimization module 204 identifies a conflict between the candidate color 322 and the candidate color 326 because the determined perceptual color difference is also the conflicting perceptual color difference. For example, difference module 210 determines that a CIEDE2000 perceptual color difference between the color vision deficiency simulation for protanopia 322P and the color vision deficiency simulation for protanopia 326P is less than 5 units. In this example, the optimization module 204 identifies an additional conflict between the candidate color 322 and the candidate color 326.

As an additional part of optimizing the objective function, the optimization module 204 implements the distance module 212 to compute distances between the candidate colors 320-328 and the original colors 306-314 in a CIELAB color space. For example, these distances represent visual similarities between the candidate colors 320-328 and the original colors 306-314. The distance module 212 determines a distance in the CIELAB color space between the original color 306 and the candidate color 320; the original color 308 and the candidate color 322; the original color 310 and the candidate color 324; the original color 312 and the candidate color 326; and the original color 314 and the candidate color 328.

The optimization module 204 continues to optimize the objective function, e.g., because of the conflicts between the candidate color 322 and the candidate color 326. At each optimization step, the optimization module 204 selects new candidate colors which have smaller distances from the original colors 306-314 in the CIELAB color space and/or which have corresponding color vision deficiency simulations with perceptual color differences that are greater than the conflicting perceptual color difference. In an example in which the Nelder-Mead simplex direct search numerical method is used to optimize the objective function, the optimization module 204 continues to step through optimization steps until reaching the maximum number of optimization steps or until the objective function is optimized. As shown in FIG. 3C, the optimization module 204 generates the replacement data 216 as describing replacement colors 332-340. For example, the display module 206 receives the replacement data 216 and processes the replacement data 216 to define the replacement colors in the color space used to define the colors described by the input data 114. The display module 206 then displays indications of the replacement colors 332-340 in a user interface of a display device such as the user interface 118 of the display device 106.

The representation 304 includes color vision deficiency simulations 342 for the replacement colors 332-340 which are usable to determine that there are no conflicts between any pair of colors included in the replacement colors 332-340. For instance, the color vision deficiency simulations 342 include color vision deficiency simulations for deuteranopia 332D, protanopia 332P, and tritanopia 332T for replacement color 332; color vision deficiency simulations for deuteranopia 334D, protanopia 334P, and tritanopia 334T for replacement color 334; color vision deficiency simulations for deuteranopia 336D, protanopia 336P, and tritanopia 336T for replacement color 336; color vision deficiency simulations for deuteranopia 338D, protanopia 338P, and tritanopia 338T for replacement color 338; and color vision deficiency simulations for deuteranopia 340D, protanopia 340P, and tritanopia 340T for replacement color 340.

Because the replacement colors 332-340 are generated by optimizing the objective function, a CIEDE2000 perceptual color difference between any pair of color vision deficiency simulations for deuteranopia, protanopia, and/or tritanopia included in the color vision deficiency simulations 342 is greater than the conflicting perceptual color difference. Also, the replacement color 332 is visually similar to the original color 306; the replacement color 334 is visually similar to the original color 308; the replacement color 336 is visually similar to the original color 310; the replacement color 338 is visually similar to the original color 312; and the replacement color 340 is visually similar to the original color 314. Finally, each of the replacement colors 332-340 is defined in the color space used to define the colors described by the input data 114. In an example in which the color space used to define the colors described by the input data 114 is the sRGB color space, each of the replacement colors 332-340 is defined in the sRGB color space.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
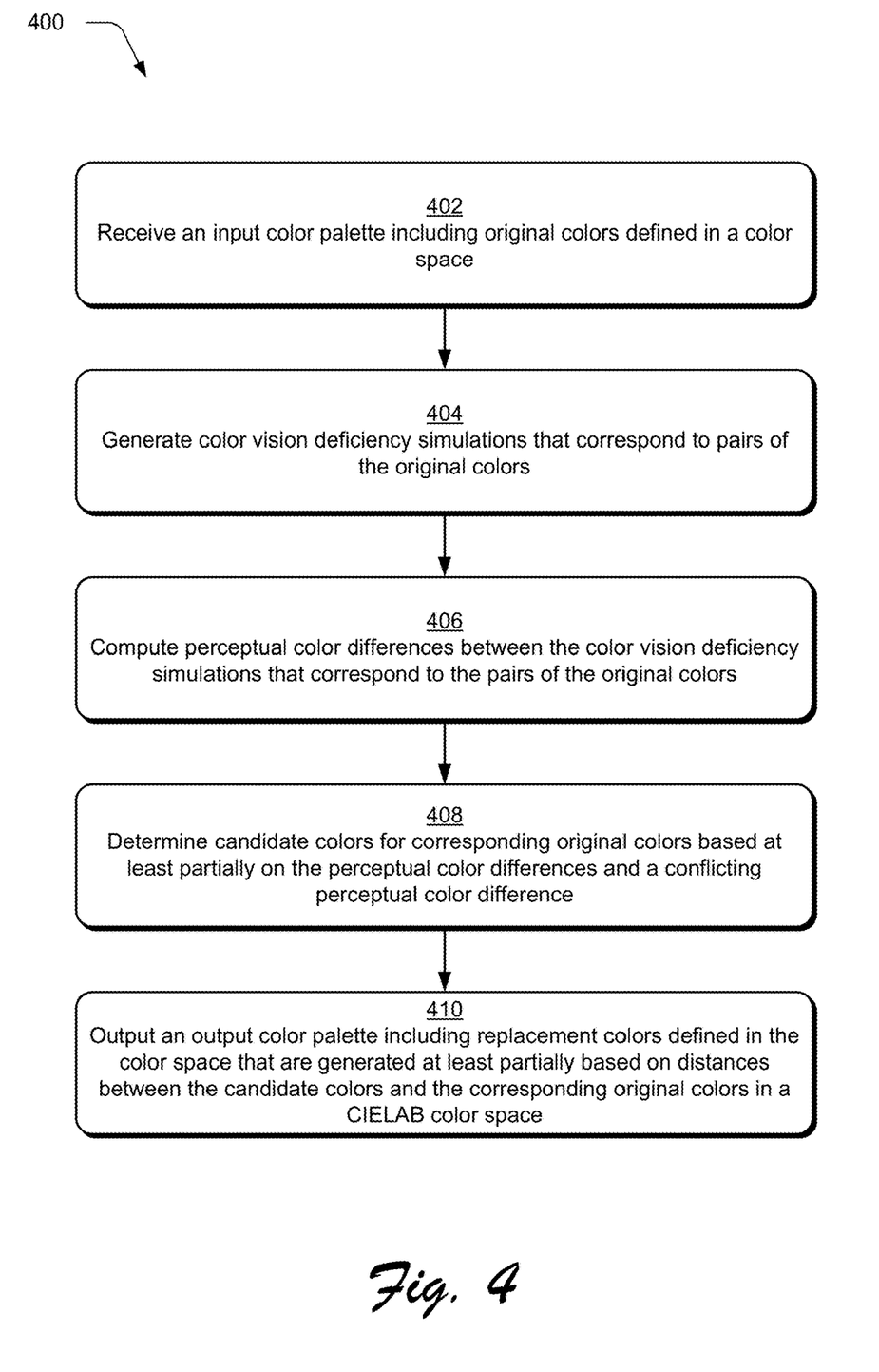
FIG. 4 is a flow diagram depicting a procedure in an example implementation in which an input color palette of original colors is received, and an output color palette of replacement colors is output.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which an input color palette of original colors is received, and an output color palette of replacement colors is output. An input color palette including original colors defined in a color space is received (block 402). For example, the computing device 102 implements the accessibility module 110 to receive the input color palette.

Color vision deficiency simulations are generated that correspond to pairs of the original colors (block 404). The accessibility module 110 generates the color vision deficiency simulations in one example. Perceptual color differences are computed between the color vision deficiency simulations that correspond to the pairs of the original colors (block 406). In an example, the accessibility module 110 computes the perceptual color differences.

Candidate colors are determined (block 408) for corresponding original colors based at least partially on the perceptual color differences and a conflicting perceptual color difference. In some examples, the computing device 102 implements the accessibility module 110 to determine the candidate colors. An output color palette is output (block 410) including replacement colors defined in the color space that are generated at least partially based on distances between the candidate colors and the corresponding original colors in a CIELAB color space. For example, the accessibility module 110 outputs the output color palette including the replacement colors.

Figure 5:
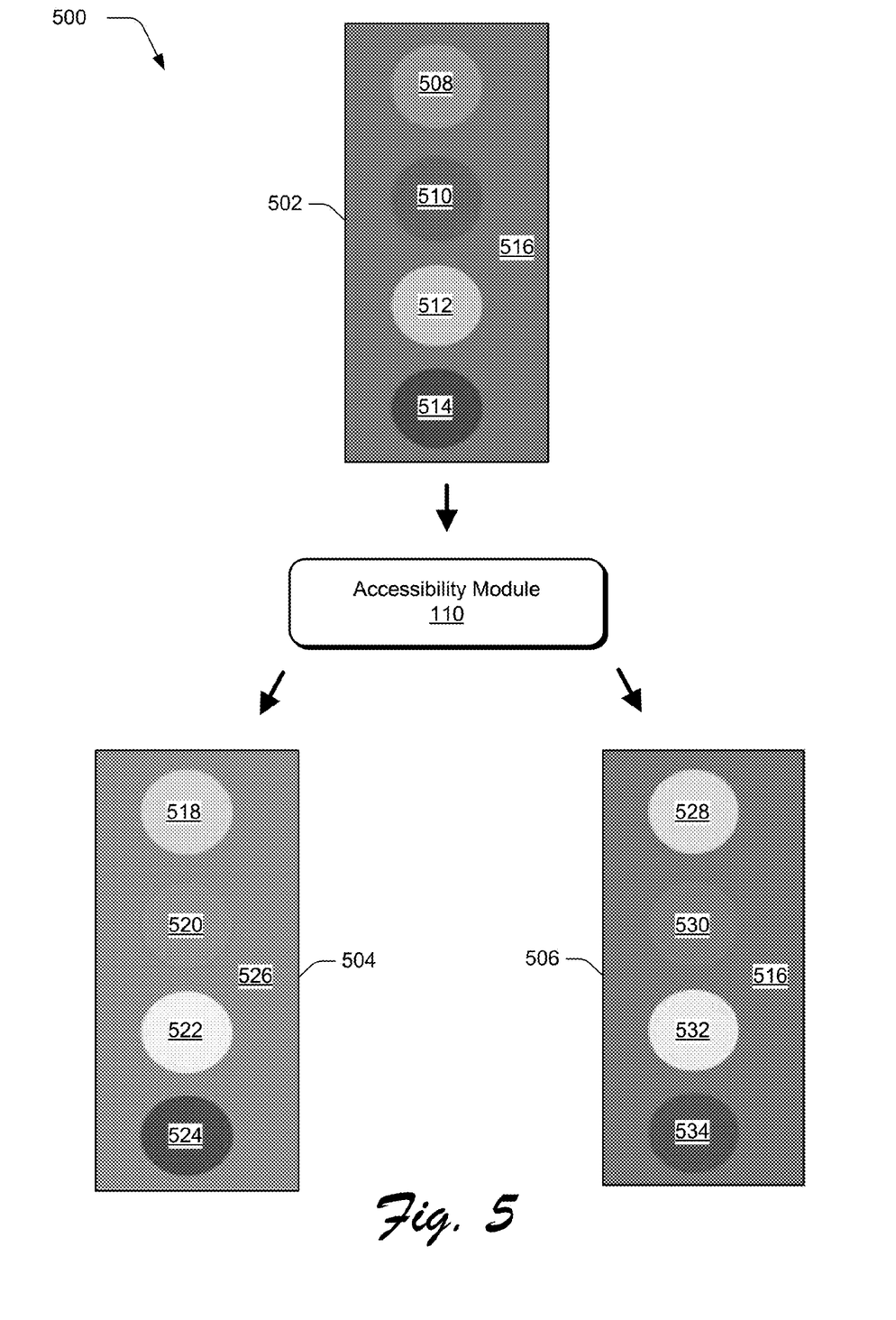
FIG. 5 illustrates an example representation of output color themes generated from an input color theme.
Figure 5B:
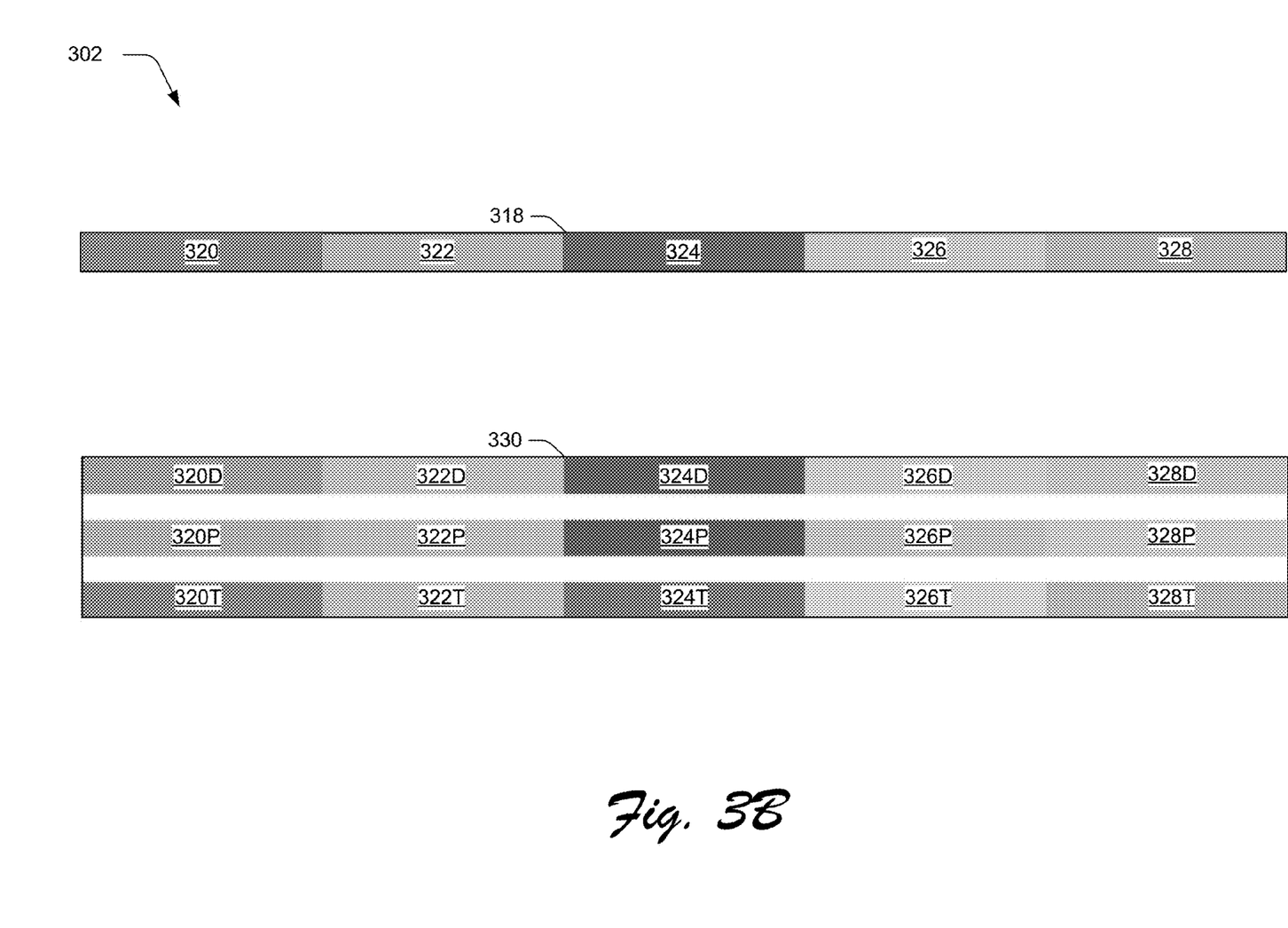

FIG. 5 illustrates an example representation 500 of output color themes generated from an input color theme. The representation 500 includes an input color theme 502 and first and second output color themes 504, 506 generated based on input data 114 describing the input color theme 502 and the conflicting perceptual color difference. As shown in FIG. 5, the input color theme 502 includes original colors 508-516.

In a first example, the accessibility module 110 receives the input data 114 describing the input color theme 502, and the accessibility module 110 processes the input data 114 to generate the first output color theme 504. For example, the accessibility module 110 generates color vision deficiency simulations for each of the original colors 508-516 and then computes CIEDE2000 perceptual color differences between pairs of the color vision deficiency simulations as part of optimizing the objective function. The accessibility module 110 determines candidate colors for each of the original colors 508-516 which are constrained to a gamut of a color space used to define the original colors 508-516 such as an sRGB color space. For instance, the accessibility module 110 generates replacement colors 518-526 based at least partially on distances between the original colors 508-516 and the replacement colors 518-526 in a CIELAB space as part of optimizing the objective function.

Continuing the first example, replacement color 518 is visually similar to original color 508; replacement color 520 is visually similar to original color 510; replacement color 522 is visually similar to original color 512; replacement color 524 is visually similar to original color 514; and replacement color 526 is visually similar to original color 516. As shown, there are also no conflicts between the replacement colors 518-526. For instance, a CIEDE2000 perceptual color difference between color vision deficiency simulations for any pair of colors included in the replacement colors 518-526 is 5 units or greater.

In a second example, the accessibility module 110 receives the input data 114 describing the input color theme 502 and a user input specifying the original color 516 to retain in the second output color theme 506. The accessibility module 110 processes the input data 114 to generate the second output color theme 506 by optimizing the objective function. For example, the accessibility module 110 generates color vision deficiency simulations for each of the original colors 508-516 and then computes CIEDE2000 perceptual color differences between pairs of the color vision deficiency simulations as part of optimizing the objective function. Even though the original color 516 will be retained in the second output color theme 506, the accessibility module 110 still generates a color vision deficiency simulation for deuteranopia, protanopia, and tritanopia for the original color 516 in order to ensure that the second output color theme 506 does not include colors which conflict with the original color 516.

The accessibility module 110 determines candidate colors for each of the original colors 508-514 which are constrained to the gamut of the color space used to define the original colors 508-516 such as the sRGB color space. For example, the accessibility module 110 generates replacement colors 528-534 based at least partially on distances between the original colors 508-514 and the replacement colors 528-534 in a CIELAB space as part of optimizing the objective function. As shown, the second output color theme 506 includes the replacement colors 528-534 and the original color 516. For instance, replacement color 528 is visually similar to the original color 508; replacement color 530 is visually similar to the original color 510; replacement color 532 is visually similar to the original color 512; and replacement color 534 is visually similar to the original color 514. There are also no conflicts between the replacement colors 528-534 and the original color 516.

As illustrated in the representation 500, replacement colors 518-524 included in the first output color theme 504 are different from corresponding replacement colors 528-534 included in the second output color theme 506. This is because when the accessibility module 110 optimized the objective function to generate the first output color theme 504, the accessibility module 110 was capable of optimizing the replacement color 526 while simultaneously optimizing the replacement colors 518-524. However, when the accessibility module 110 optimized the objective function to generate the second output color theme 506, the accessibility module 110 was not allowed to optimize the original color 516 based on the user input. Rather, the accessibility module 110 was only capable of simultaneously optimizing the replacement colors 528-534. As a result of this, the replacement color 518 is different from the replacement color 528; the replacement color 520 is different from the replacement color 530; the replacement color 522 is different from the replacement color 532; and the replacement color 524 is different from the replacement color 534.

Improvement Examples

Table 1 presents performance comparisons between the described systems for generating accessible color themes and conventional systems that generate color themes using confusion lines. In Table 1, accuracy for color palettes generated by the described systems and for color palettes generated by the conventional systems is based on numbers of conflicts in generated color palettes. A conflict is defined to exist if color vision deficiency simulations for any pair of colors included in the generated palettes are separated by a CIEDE2000 perceptual color difference of 5 units or less. To compare the described systems with the conventional systems, 1000 input color palettes were randomly generated to include at least one conflict for each of the numbers of colors evaluated. Output color palettes were generated by the described systems and the conventional systems for each of the different numbers of colors evaluated and the output color palettes were analyzed for accuracy. Results of this analysis are presented in Table 1 below for the described systems and the conventional systems based on the input color palettes having between 5 and 10 colors.

TABLE 1

| Number of Colors | Accuracy of Described Systems without Confusion Lines | Accuracy of Conventional Systems with Confusion Lines |
| --- | --- | --- |
| 5 | 96.3% | 56.9% |
| 6 | 90.2% | 45.8% |
| 7 | 75.6% | 33.2% |
| 8 | 64.6% | 23.4% |
| 9 | 43.9% | 15.0% |
| 10 | 31.6% | 7.7% |

As shown in Table 1 above, the described systems outperformed the conventional systems in terms of accuracy in each of the different scenarios evaluated. For input color palettes having 5 colors, the described systems generated output color palettes with 39.4% greater accuracy than the conventional systems. This is about a 69.2% increase in accuracy for the described systems relative to the conventional systems. For input color palettes having 10 colors, the described systems generated output color palettes with 23.9% greater accuracy than the conventional systems. This is about a 310% increase in accuracy for the described systems relative to the conventional systems.

Example System and Device

Figure 6:
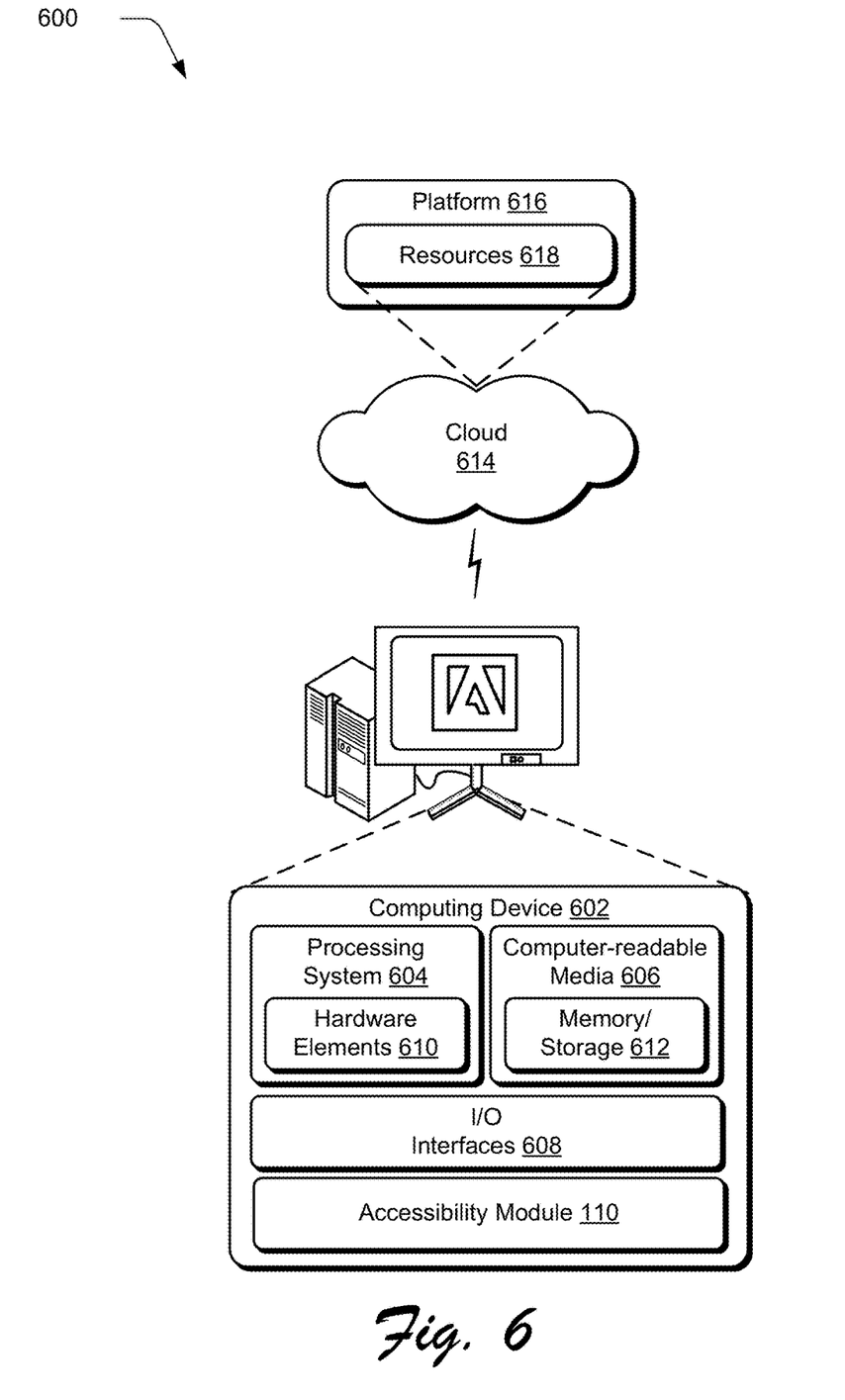
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the accessibility module 110. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage 612 includes volatile media (such as random access memory (RAM)) and/or nonvolatile media (such as read only memory (ROM), Flash memory, optical disks, magnetic disks, and so forth). In another example, the memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although implementations of systems for generating accessible color themes have been described in language specific to structural features and/or methods, it is to be understood that the appended claims are not necessarily limited to the specific features or methods described. Rather, the specific features and methods are disclosed as example implementations of systems for generating accessible color themes, and other equivalent features and methods are intended to be within the scope of the appended claims. Further, various different examples are described and it is to be appreciated that each described example is implementable independently or in connection with one or more other described examples.

What is claimed is:

1. A method comprising:
  receiving, by a processing device, an input color palette including original colors defined in a color space;
  generating, by the processing device, color vision deficiency simulations that correspond to pairs of the original colors;

computing, by the processing device, perceptual color differences between the color vision deficiency simulations that correspond to the pairs of the original colors;

determining, by the processing device, candidate colors for corresponding original colors based at least partially on the perceptual color differences and a conflicting perceptual color difference; and outputting, by the processing device, an output color palette including replacement colors defined in the color space that are generated at least partially based on distances between the candidate colors and the corresponding original colors computed in a CIELAB color space.

2. The method as described in claim 1, wherein the color space is not a perceptually uniform color space.

3. The method as described in claim 1, wherein the color vision deficiency simulations that correspond to the pairs of the original colors include a protanopia simulation, a deuteranopia simulation, and a tritanopia simulation.

4. The method as described in claim 1, wherein the color vision deficiency simulations that correspond to the pairs of the original colors are generated at a maximum severity.

5. The method as described in claim 1, further comprising constraining the candidate colors within a gamut of the color space.

6. The method as described in claim 1, further comprising receiving a user input specifying a particular color of the original colors to retain in the output color palette and the output color palette includes the particular color and the replacement colors.

7. The method as described in claim 1, wherein the conflicting perceptual color difference is less than 5 dE00 units.

8. The method as described in claim 1, wherein the replacement colors are generated at least partially by optimizing an objective function that includes a term for the perceptual color differences, a term for the distances between the candidate colors and the corresponding original colors, and a term for constraining the candidate colors within a gamut of the color space.

9. The method as described in claim 8, wherein the objective function is optimized using a non-derivative-based optimization algorithm.

10. The method as described in claim 8, wherein the objective function is optimized using a derivative-based optimization algorithm.

11. A system comprising:
a memory component; and
a processing device coupled to the memory component, the processing device to perform operations comprising:
receiving an input color palette including original colors defined in a color space;
generating color vision deficiency simulations that correspond to pairs of the original colors;
computing perceptual color differences between the color vision deficiencies simulations that correspond to the pairs of the original colors;
determining candidate colors for corresponding original colors based at least partially on the perceptual color differences and a conflicting perceptual color difference;

constraining the candidate colors within a gamut of the color space; and
outputting an output color palette including replacement colors defined in the color space that are generated at least partially based on distances between the candidate colors and the corresponding original colors computed in a CIELAB color space.

12. The system as described in claim 11, wherein the color vision deficiency simulations that correspond to the pairs of the original colors include a protanopia simulation, a deuteranopia simulation, and a tritanopia simulation.

13. The system as described in claim 11, wherein the color vision deficiency simulations that correspond to the pairs of the original colors are generated at a maximum severity.

14. The system as described in claim 11, wherein the conflicting perceptual color difference is less than 5 dE00 units.

15. The system as described in claim 11, wherein the operations further comprise receiving a user input specifying a particular color of the original colors to retain in the output color palette and a perceptual color difference between the particular color and any color included in the replacement colors is at least 5 dE00 units.

16. A non-transitory computer-readable storage medium storing executable instructions, which when executed by a processing device, cause the processing device to perform operations comprising:
receiving an input color palette including original colors defined in a color space;
generating color vision deficiency simulations that correspond to pairs of the original colors;
computing perceptual color differences between the color vision deficiency simulations that correspond to the pairs of the original colors;
determining candidate colors for corresponding candidate colors based at least partially on the perceptual color differences and a conflicting perceptual color difference;
constraining the candidate colors within a gamut of the color space; and
outputting an output color palette including replacement colors defined in the color space that are generated at least partially based on distances between the candidate colors and the corresponding original colors.

17. The non-transitory computer-readable storage medium as described in claim 16, wherein the distances between the candidate colors and the corresponding original colors are not computed in the color space.

18. The non-transitory computer-readable storage medium as described in claim 16, wherein the color vision deficiency simulations that correspond to the pairs of the original colors include a protanopia simulation, a deuteranopia simulation, and a tritanopia simulation.

19. The non-transitory computer-readable storage medium as described in claim 16, wherein the color vision deficiency simulations that correspond to the pairs of the original colors are generated at a maximum severity.

20. The non-transitory computer-readable storage medium as described in claim 16, wherein the conflicting perceptual color difference is less than 5 dE00 units.

* * * * *